(12) United States Patent
Lei (10) Patent No.: US 12,143,896 B2
(45) Date of Patent: Nov. 12, 2024

(54) SYSTEMS AND METHODS FOR PROVIDING A VEHICLE-AND DRONE-BASED TRACKING SYSTEM

(71) Applicant: Ford Global Technologies, LLC, Dearborn, MI (US)

(72) Inventor: Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 337 days.

(21) Appl. No.: 17/659,853

(22) Filed: Apr. 20, 2022

(65) Prior Publication Data

US 2023/0345203 A1    Oct. 26, 2023

(51) Int. Cl.
*H04W 4/029* (2018.01)
*H04W 4/90* (2018.01)

(52) U.S. Cl.
CPC ............. *H04W 4/029* (2018.02); *H04W 4/90* (2018.02)

(58) Field of Classification Search
CPC .................................. H04W 4/029; H04W 4/90
See application file for complete search history.

(56) References Cited

U.S. PATENT DOCUMENTS

| | | |
|---|---|---|
| 10,216,181 B2 | 2/2019 | Fox et al. |
| 10,764,763 B2 | 9/2020 | Byrne |
| 2008/0195428 A1* | 8/2008 | O'Sullivan .......... G06Q 10/025 705/6 |
| 2012/0130636 A1* | 5/2012 | Westerlage .............. G07C 5/02 701/519 |
| 2018/0189713 A1* | 7/2018 | Matthiesen ............ G06Q 50/40 |
| 2018/0327091 A1 | 11/2018 | Burks et al. |
| 2019/0144024 A1* | 5/2019 | Schmidt ................ B61L 25/021 246/115 |
| 2019/0271550 A1 | 9/2019 | Breed et al. |
| 2023/0162610 A1* | 5/2023 | Beaudouin-Lafon ....................... B64C 39/024 701/3 |

OTHER PUBLICATIONS

Gustavo Cedeno Bravo et al., First Aid Drone for Outdoor Sports Activities, Proceedings of the 1st Internatonal Conference on Technology and Innovation in Sports, Health and Wellbeing, 2016.

(Continued)

*Primary Examiner* — Congvan Tran
(74) *Attorney, Agent, or Firm* — Emily Drake; Eversheds Sutherland (US) LLP (57) ABSTRACT

The disclosure generally pertains to systems and methods for providing a vehicle- and drone-based tracking system. In an example method, a tracker system associated with a vehicle may be initiated. At least one parameter associated with a route may be received via the tracker system. A first notification may subsequently be received from a device, and the first notification may be associated with a first location of the device. After a first predetermined period of time since the first notification is received, a second notification may be received from the device. The second notification may be associated with a second location of the device. The tracker system may then determine, based on the second notification, that the second location of the device is within the at least one parameter associated with the route.

17 Claims, 5 Drawing Sheets

(56) References Cited

OTHER PUBLICATIONS

Rob Matheson, Fleets of Drones Could Aid Searches for Lost Hikers, MIT News, Nov. 1, 2018, 1-5.
Victor Wolfe et al., Detecting and Locating Cell Phone Signals from Avalanche Victims Using Unmanned Aerial Vehicles, 2015 International Conference on Unmanned Aircraft Systems, Jun. 9-12, 2015, 704-713.

* cited by examiner

SYSTEMS AND METHODS FOR PROVIDING A VEHICLE-AND DRONE-BASED TRACKING SYSTEM

BACKGROUND

People who participate in hiking, running, and other similar activities may travel to a starting point via a vehicle, park the vehicle at the starting point, and then engage in such activities on foot. Often, hikers, runners, and other people who are traveling on foot will carry a user device (for example, a cell phone) with them. In some instances, a hiker, runner, or other person may require assistance while participating in such activities. However, in some instances, the hiker, runner, or other person may not be able to obtain assistance for a variety of reasons. For example, the user device may have already run out of battery by the time assistance is desired. As another example, the hiker, runner, or other person may be unable to use his or her user device to obtain assistance due to a safety threat.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to systems and methods for providing a vehicle- and drone-based tracking system. In an example method, a tracker system associated with a vehicle may be initiated. At least one parameter associated with a route may be received via the tracker system. A first notification may be subsequently received from a device, where the first notification is associated with a first location of the device. A second notification may then be received from the device after a first predetermined period of time since the first notification has been received. The second location of the device may then be determined to be within the at least one parameter associated with the route based on the second notification.

ILLUSTRATIVE EMBODIMENTS

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "user" may be used interchangeably with the word "hiker" and the word "runner." Either word as used herein refers to any individual that is utilizing the vehicle- and drone-based tracker system. The word "device" may be any of various devices, such as, for example, a user device such as a smartphone or a tablet, a smart vehicle, and a computer. The word "sensor" may be any of various sensors that can be found in a vehicle, such as cameras, radar sensors, Lidar sensors, and sound sensors.

It must also be understood that words such as "implementation," "scenario," "case," and "situation" as used herein are an abbreviated version of the phrase "in an example ("implementation," "scenario," "case," "approach," and "situation") in accordance with the disclosure." Furthermore, the word "example" as used herein is intended to be non-exclusionary and non-limiting in nature.

Figure 1:
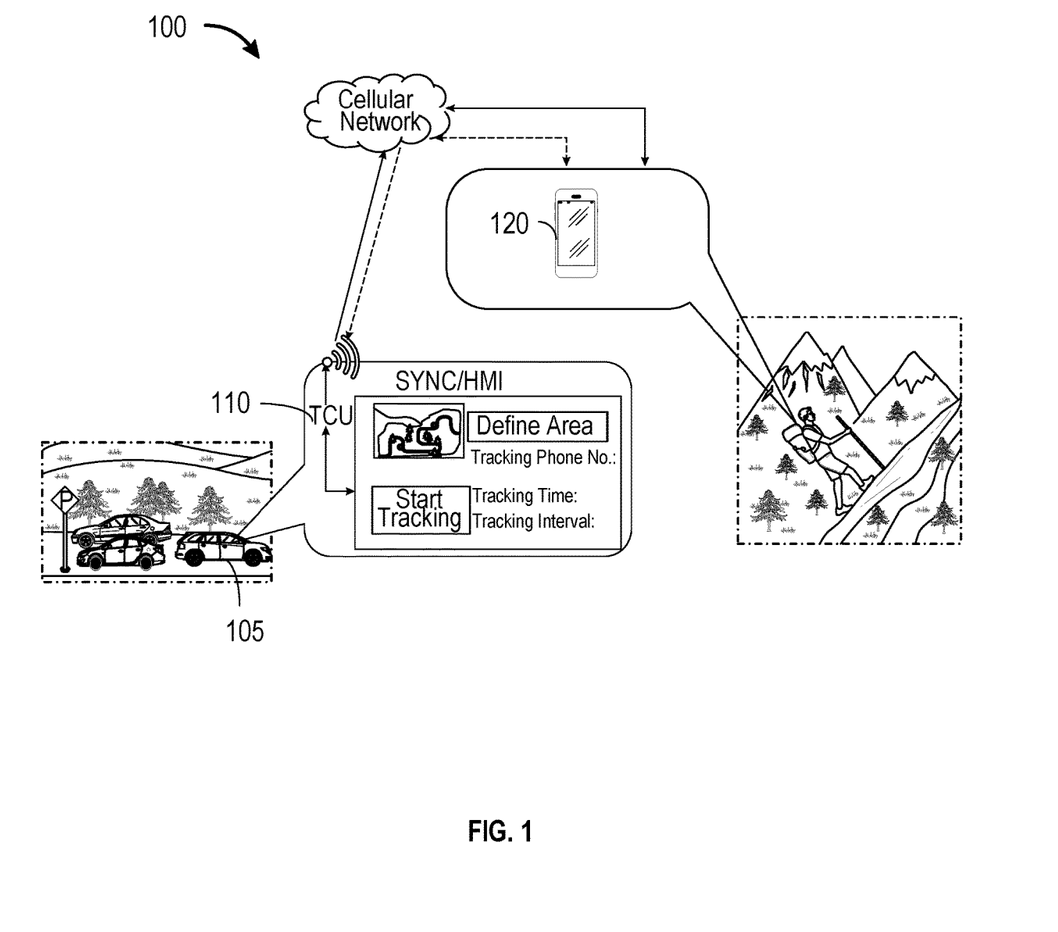
FIG. 1 illustrates an example implementation of a vehicle- and drone-based tracking system in accordance with an embodiment of the disclosure.

FIG. 1 illustrates an example vehicle- and drone-based tracker system 100 in accordance with an embodiment of the disclosure. The vehicle- and drone-based tracker system 100 may utilize a telematics control unit (TCU) 110 at a vehicle 105 and a user device 120 that is communicatively coupled to the vehicle 105 to assist in tracking a user associated with the vehicle 105 and the user device 120. In some embodiments, at least one drone mounted to the vehicle 105 may be configured to be communicatively coupled to the vehicle 105 and may be configured to participate in the vehicle- and drone-based tracker system 100. In some embodiments, the vehicle- and drone-based tracker system 100 may thus be configured to provide emergency assistance to the user associated with the vehicle 105 and the user device 120 if emergency assistance is desirable.

In some embodiments, the vehicle- and drone-based tracker system 100 associated with the vehicle 105 may be initiated. As an example, the vehicle- and drone-based tracker system 100 may be initiated after a hiker or runner has driven the vehicle 105 to a parking lot next to a trail entrance point and parked in the parking lot. When the vehicle- and drone-based tracker system 100 is initiated, at least one parameter associated with a route may be received by the vehicle- and drone-based tracker system 100. In some embodiments, the route may refer to a hiking area that the user will be traveling in, or the route may refer to a hiking trail that the user will be taking. In some embodiments, the at least one parameter associated with the route may refer to a geographic area, a distance, or a duration associated with the route. In some embodiments, the duration associated with the route may include an estimated time for the user to travel along the route and return to the vehicle 105.

In some embodiments, the at least one parameter associated with the route may be input by the user at the vehicle 105. For example, the user may input the at least one parameter associated with the route at a map displayed at a human machine interface in the vehicle 105. In some instances, the user may be able to touch points on the map to indicate the planned hiking area. In some embodiments, the user may further input a tracking phone number associated with the user device 120. In some embodiments, the user may initiate tracking by pressing a button displayed at the human machine interface in the vehicle 105.

In some embodiments, after the vehicle- and drone-based tracker system 100 has been initiated, the TCU 110 may be configured to check its cellular network connectivity quality. For example, the TCU 110 may check its Received Signal Strength Indicator (RSSI) levels and/or its Reference Signal Received Power (RSRP) levels if the TCU determines that its cellular network connectivity quality is below a predetermined minimum threshold, the vehicle 105 may provide a notification to the user to move the vehicle 105 to a different area.

In some embodiments, the user continues to carry the user device 120 on his or her person after initiating tracking at the vehicle 105. In some embodiments, the user device 120 is configured to transmit a notification to the TCU 110 at periodic intervals. In some embodiments, the notification may include a present location of the user device 120. In some embodiments, the notification may additionally include a current battery level of the user device 120, signal strength data associated with the user device 120, and/or a predicted interval from the current notification to the next notification. In some instances, the predicted interval may assist the TCU 110 in determining when to expect the next notification.

In some embodiments, the predicted interval may be periodic. For example, the predicted interval may be a predetermined number of minutes. In other embodiments, the predicted interval may vary based at least in part on a battery level associated with the user device 120 and/or signal strength data associated with the user device 120. For example, the predicted interval may increase as the battery level associated with the user device 120 and/or signal strength data associated with the user device 120 decreases, while the predicted interval may decrease as the battery level associated with the user device 120 and/or signal strength data associated with the user device 120 increases. In other embodiments, the predicted interval may vary based at least in part on a battery level associated with the vehicle 105. Because the TCU 110 needs to be woken up when each notification is received, the implementation of the vehicle- and drone-based tracker system 100 may cause battery drain at the vehicle 105. For example, the predicted interval may increase as the battery level associated with the vehicle 105 decreases, while the predicted interval may decrease as the battery level associated with the vehicle 105 increases. In some embodiments, if the TCU 110 detects that a battery level associated with the vehicle 105 has fallen below a predetermined minimum threshold, the TCU 110 may be configured to start the engine of the vehicle 105 in order to charge the battery of the vehicle 105 for a predetermined period of time.

In some embodiments, the predicted interval may vary based on the period of time associated with the route. In one example, at the beginning of the period of time, the predicted interval may be larger. In some embodiments, once 50% of the period of time has elapsed, the predicted interval may decrease. The predicted interval may then continue to decrease as a greater percentage of the period of time elapses. In some embodiments, the predicted interval may be configured to follow a pattern. For example, the predicted interval may be a first longer interval between a first notification and a second notification, a second shorter interval between the second notification and a third notification, a third longer interval similar to the first longer interval between the third notification and a fourth notification, a fourth shorter interval similar to the second shorter interval between the fourth notification and a fifth notification, and so on. In other embodiments, the user may set the predicted interval between the current notification and the next notification. In some embodiments, the user may set a periodic interval to be applied as the predicted interval. It should be further noted that the user device 120 may still periodically communicate its location to the TCU 110 in addition to the notifications.

In some embodiments, the notifications may be in the form of text messages, which may still be sent even in environments having poor cellular network coverage. In some embodiments, upon receiving a notification, the TCU 110 may wake up and store the information contained within the notification. The TCU 110 may also map the location information associated with the user device 120 to a map of the hiking area and determine whether the user device 120 is located within the hiking area. If the user device 120 is determined to not be within the hiking area, the TCU 110 may send an alert to the user device 120 to provide the user with directions for returning to the hiking area.

In some embodiments, a first notification may thus be received from the user device 120. The first notification may be associated with a first location of the user device 120. The TCU 110 may store the information contained within the first notification. Subsequently, after a first predetermined period of time has passed since the receipt of the first notification, a second notification may be received from the user device 120, and the second notification may be associated with a second location of the user device 120. The TCU 110 may then store the information contained within the second notification, and the TCU 110 may then use the information contained in the second notification to determine that the user device 120 is located within the predefined parameters associated with the route, such as a geographic area, a distance, and/or a duration.

In some embodiments, a third notification may be received from the user device 120 after a second predetermined period of time has elapsed since the second notification was received by the TCU 110. The third notification may be associated with a third location of the user device 120. In some embodiments, the information contained in the third notification may reveal that the third location of the user device 120 is not within the at least one parameter associated with the route. For example, the user device 120 may be located outside of the predefined hiking area. In some embodiments, the TCU 110 may send a verification request to the user device 120 based on the determination that the third location of the user device 120 is not within the at least one parameter associated with the route. In some embodiments, the TCU 110 may wait for a third predetermined period of time for a response to the verification request. If no response to the verification request is received after the third predetermined period of time has elapsed, an emergency call may be initiated.

In some embodiments, if the TCU 110 has not received an expected notification from the user device 120, the TCU 110 may send a reminder notification to the user device 120. The reminder notification may remind the user to check in through the user device 120 to ensure that the user does not require assistance. If the user continues to ignore the reminder notification, or multiple reminder notifications, the TCU 110 may trigger an emergency call after the user has ignored a predefined number of reminder notifications. In some embodiments, the predefined number of reminder notifications may also vary based on a battery level and/or signal strength data associated with the user device 120.

In some embodiments, if the user device 120 is out of cellular network coverage and is presently incapable of transmitting text messages, the TCU 110 may start a timer. In some embodiments, the user device 120 may be determined to be out of cellular network coverage and be incapable of transmitting text messages when the RSSI levels and/or the RSRP levels are less than −95 dBm. In some embodiments, the timer may be configured by the user at the human machine interface of the vehicle 105, or the timer may be configured by a text message from the user device 120. When the timer expires, the TCU 110 may be configured to send a verification request to the user device 120. If the TCU 110 fails to receive a response within a predetermined period of time from sending the verification request, the TCU 110 may initiate an emergency call. The verification request may assist in preventing false alarms from triggering emergency calls. In some embodiments, if the user device 120 is still out of cellular network coverage and is still incapable of transmitting text messages when the timer ends, the user device 120 may be alerted that an emergency call is being initiated by the TCU 110. The timer may be stopped when the user device 120 has cellular network coverage and/or becomes capable of transmitting text messages. For example, the user device 120 may transmit a notification to the TCU 110 that the user device 120 will be losing the ability to transmit text messages for 30 minutes. As a result of this notification, the TCU 110 will not expect any further notifications for the next 30 minutes, and the TCU 110 may only initiate an emergency call if no notifications are received from the user device 120 after 30 minutes.

In some embodiments, the vehicle- and drone-based tracker system 100 may be further configured to detect abnormal motions associated with the user device 120. In some embodiments, the TCU 110 may thus be able to detect if an emergency has occurred. For example, the user may have fallen or require other medical assistance, or the user may have been kidnapped or attacked by an animal. In such embodiments, motion sensors associated with the user device 120 may detect motions that are abnormal from walking and/or running motions. For example, motions associated with the user device 120 falling may be considered abnormal. If such an abnormal motion is detected, the user device 120 may be configured to transmit an emergency notification to the TCU 110. In some embodiments, the TCU 110 may then transmit a verification request back the user device 120. If the user verifies via the user device 120 that assistance is not required within a predetermined period of time, the TCU 110 may subsequently ignore the emergency notification. If the user fails to provide a response to the verification request via the user device 120, the TCU 110 may prompt the user device 120 again with another verification request. If the TCU 110 continues to receive no response from the user device 120, the TCU 110 may initiate an emergency call.

In some embodiments, if abnormal motions such as fighting or the user device 120 being thrown are detected, the user device 120 may transmit a notification to the TCU 110 to initiate an emergency call. In some embodiments, the motion sensors associated with the user device 120 may be configured to detect the user device 120 being shaken. Shaking the user device 120 may be an automatic trigger for the user device 120 to transmit a notification to the TCU 110 to initiate an emergency call. In some embodiments, if an emergency call is initiated, the emergency call may include the last reported location associated with the user device 120, historical location data along the route associated with the user device 120, a phone number associated with the user device 120, and/or other relevant information.

In some embodiments, when the user returns to the vehicle 105 after having completed his or her hike or run, the user may be able to press a button on the human machine interface of the vehicle 105 to terminate the vehicle- and drone-based tracker system 100.

In some embodiments, the vehicle- and drone-based tracker system 100 may be configured to reduce depletion to the battery level associated with the user device 120. In some examples, the user device 120 may be configured to only transmit notifications to the TCU 110 when changes in movement associated with the user device 120 are detected. For example, notifications may be transmitted to the TCU 110 if the user device 120 detects changes in the user's gait, changes in whether the user is motion or stationary, changes in the user's speed, and/or sudden changes in the user's location and/or altitude. Upon receiving the notification from the user device 120, the TCU 110 may send a verification request to the user device 120. If no response is received from the user device 120 within a predetermined period of time, the TCU 110 may send another verification request to the user device 120 and initiate an emergency call if no response is subsequently received within another predetermined period of time.

In some embodiments, the user device 120 may be configured to transmit notifications to the TCU 110 when network coverage is detected. For example, the user device 120 may be configured to send monitoring notifications when the RSSI levels of the user device 120 are approximately −95 dBm to monitor location data associated with the user device 120. If the user device 120 has entered a zone where the RSSI levels are too low and the user device 120 is incapable of transmitting text messages, the user device 120 may alert the user to move to an area with better network coverage. The alert may be a visual, audio, and/or haptic alert. Thus, if the user device 120 is moved to an area with better network coverage, the user device 120 does not consume power to search for a network. The user device 120 may terminate the monitoring notifications when the RSSI levels of the user device 120 increase to above −95 dBm. In such an instance, the user device 120 may notify the TCU 110 that the user device 120 is terminating the monitoring notifications.

In some embodiments, if multiple users are associated with the vehicle 105, the vehicle- and drone-based tracker system 100 may be configured to utilize multiple user devices 120 in order to reduce the depletion of battery levels of the user devices 120. For example, if multiple user devices 120 are traveling along the same route, only a first user device 120 may be configured to communicate with the TCU 110, while the other user devices 120 may be turned off. If the first user device 120 runs out of battery, the TCU 110 may rely on another user device 120 being turned back on to continue the implementation of the vehicle- and drone-based tracker system 100.

Figure 2:
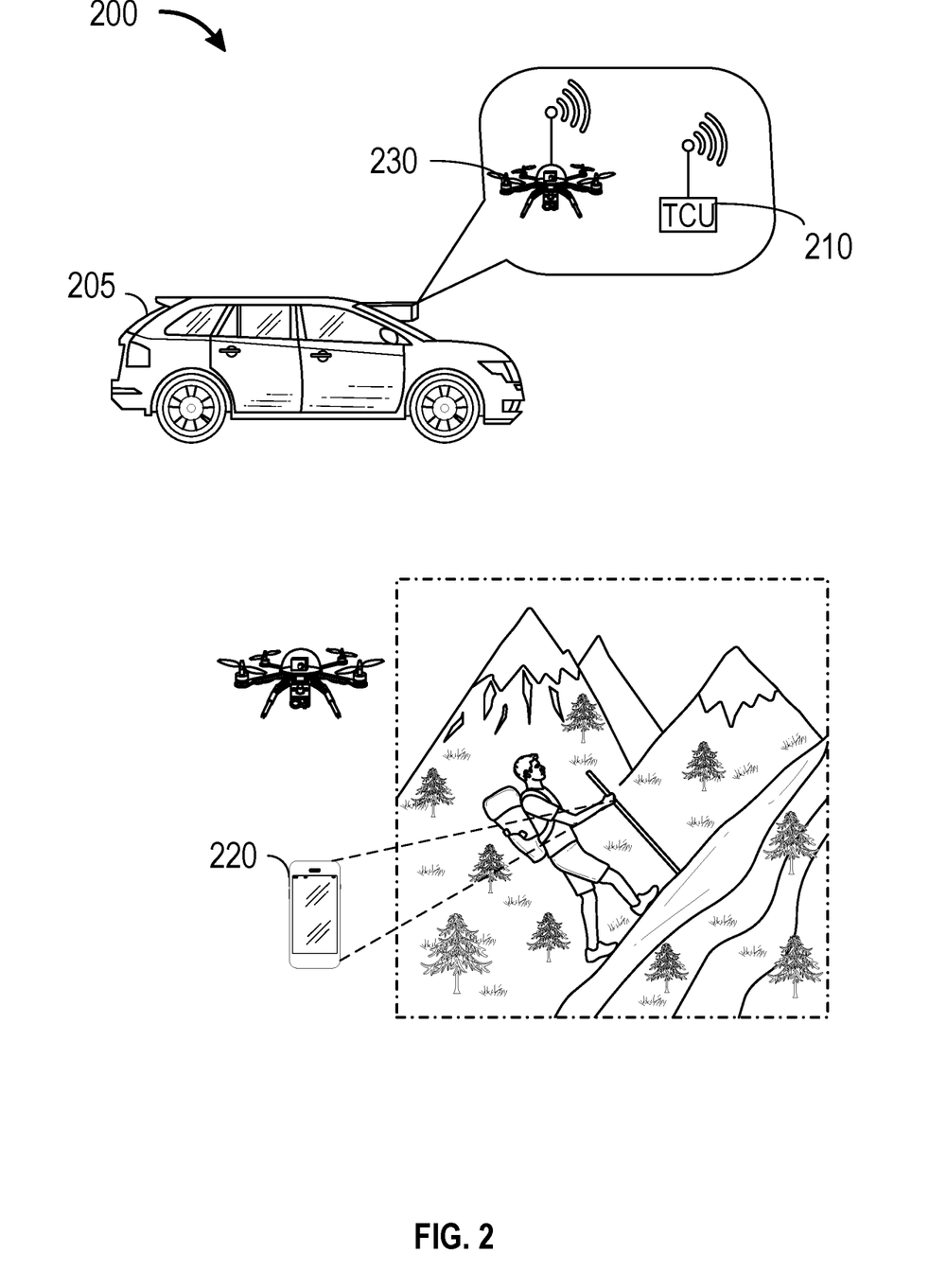
FIG. 2 illustrates an example implementation of a vehicle- and drone-based tracking system in accordance with an embodiment of the disclosure.

FIG. 2 illustrates an example implementation of a vehicle- and drone-based tracker system 200 in accordance with an embodiment of the disclosure. In some embodiments, the vehicle- and drone-based tracker system 200 may utilize at least one drone 230 mounted to a vehicle 205 in addition to a TCU 210 of the vehicle 205 and a user device 220. In some embodiments, when the TCU 210 fails to receive a response from the user device 220 in response to a verification request, the TCU 210 may be configured to initiate launch of the at least one drone 230. The at least one drone 230 may be configured to fly to a latest known location associated with the user device 220. In some embodiments, the latest known location associated with the user device 220 may be the location associated with the last received notification.

In some embodiments, the at least one drone 230 may be configured with sensor(s), such as cameras, a GPS system, and cellular vehicle-to-everything (C-V2X) communication capabilities. When the at least one drone 230 has traveled to the latest known location associated with the user device 220, the at least one drone 230 may take pictures and/or videos from a variety of angles to assist in future search and/or investigation efforts. If the at least one drone 230 is configured to search for the user, the at least one drone 230 may subsequently increase its search radius and/or fly along the predicted route to search for the user.

In some embodiments, the at least one drone 230 may be configured to perform preliminary investigations prior to the initiation of an emergency call. For example, if the at least one drone 230 detects an emergency, an emergency notification may be transmitted to a public-safety answering point (PSAP) via the at least one drone's 230 C-V2X capabilities. The emergency notification may include the images and/or video feeds taken by the at least one drone 230. If the at least one drone 230 does not include C-V2X capabilities, the at least one drone 230 may be configured to return to the vehicle 205 and transfer its recordings to the TCU 210. The TCU 210 may then trigger an emergency call if an emergency is detected.

Figure 3:
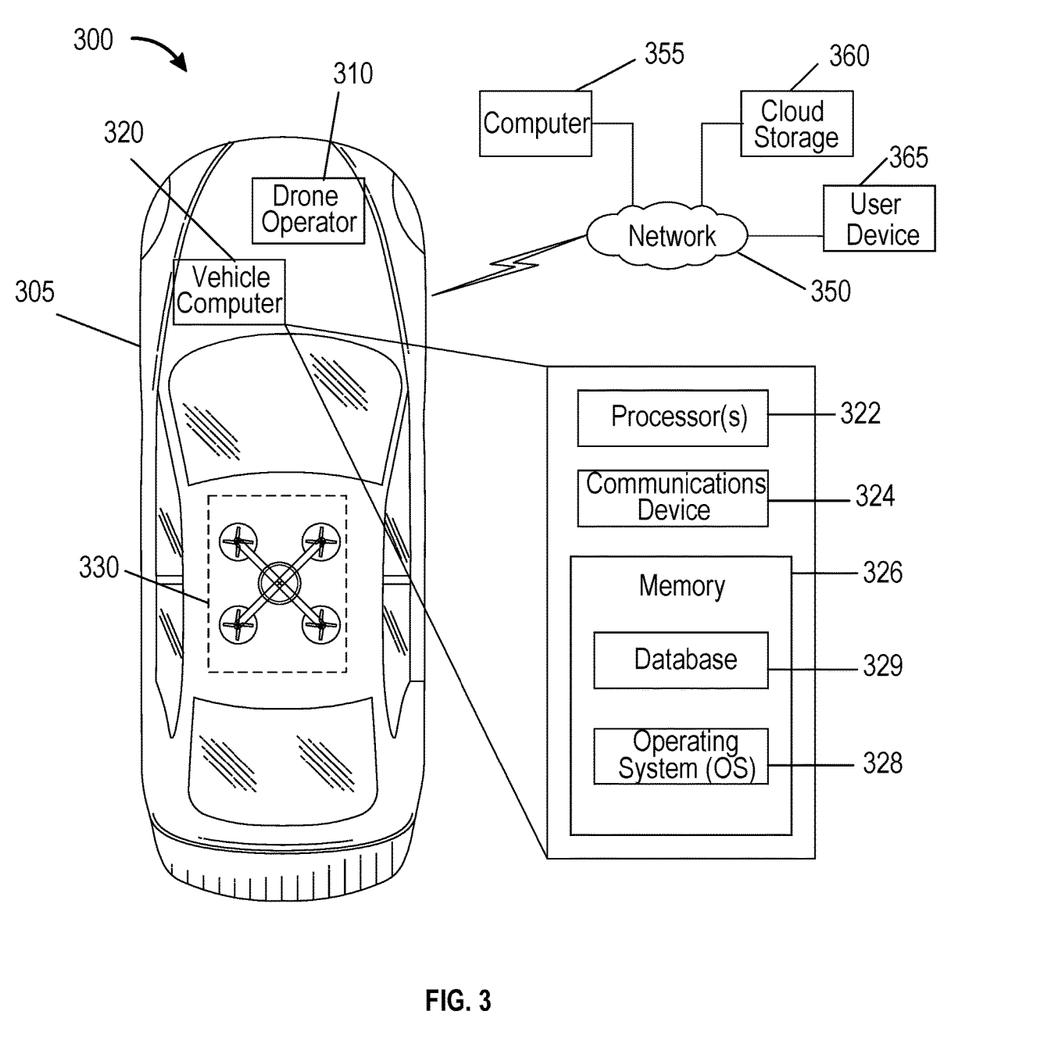
FIG. 3 illustrates an example vehicle- and drone-based tracking system in accordance with an embodiment of the disclosure.

FIG. 3 illustrates an example vehicle- and drone-based tracking system 300 in accordance with an embodiment of the disclosure. The vehicle- and drone-based tracking system 300 may be carried out by a vehicle 305, which may be any of various types of vehicles such as, for example, a gasoline powered vehicle, an electric vehicle, a hybrid electric vehicle, an autonomous vehicle, a sedan, a van, a minivan, a sports utility vehicle, a truck, a station wagon, or a bus.

The vehicle 305 may further include components such as, for example, a drone operator 310 and a vehicle computer 320. The vehicle 305 may further include various types of sensors and detectors configured to provide various functionalities. In some embodiments, the drone operator 310 may not be physically built into the vehicle 305, but may be wirelessly connected to the vehicle 305. In other embodiments, the drone operator 310 may be detachable from the vehicle 305. In yet other embodiments, the drone operator 310 may be built into the vehicle 305.

In some embodiments, at least one drone 330 may be mounted to the vehicle 305. In some embodiments, the at least one drone 330 may be wirelessly connected to the drone operator 310 and may be communicatively coupled to the vehicle computer 320.

In some embodiments, the vehicle computer 320 may include a processor 322, a communications device 324, and a memory 326. It must be understood that the memory 326 is a functional block that can be implemented in hardware, software, or a combination thereof. The processor 322 may carry out various operations by executing computer-readable instructions stored in the memory 326. The memory 326, which is one example of a non-transitory computer-readable medium, may be used to store a database 329 for storing data and an operating system (OS) 328.

In some embodiments, the various components of the vehicle computer 320 may be communicatively coupled to each other via wired and/or wireless connections. More particularly, the various components of the vehicle computer 320 may be communicatively coupled to the vehicle 305 via a vehicle bus that uses a controller area network (CAN) bus protocol, a Media Oriented Systems Transport (MOST) bus protocol, and/or a CAN flexible data (CAN-FD) bus protocol. In another embodiment, the communications may be provided via wireless technologies such as Bluetooth®, Ultra-Wideband (UWB), cellular, Wi-Fi, ZigBee®, or near-field communications (NFC).

In some embodiments, the drone operator 310 and the vehicle computer 320 are configured to communicate via a network 350 with devices located outside the vehicle 305, such as, for example, a computer 355 (a server computer, a cloud computer, etc.), a cloud storage device 360, and or a user device 365 (a mobile phone, a laptop, a tablet, etc.).

The network 350 may include any one, or a combination of networks, such as, for example, a local area network (LAN), a wide area network (WAN), a telephone network, a cellular network, a cable network, a wireless network, and/or private/public networks such as the Internet. The network 350 may support any of various communication technologies, such as, for example, TCP/IP, Bluetooth®, near-field communication (NFC), Wi-Fi, Wi-Fi Direct, Ultra-Wideband (UWB), cellular, machine-to-machine communication, and/or man-to-machine communication.

Figure 4:
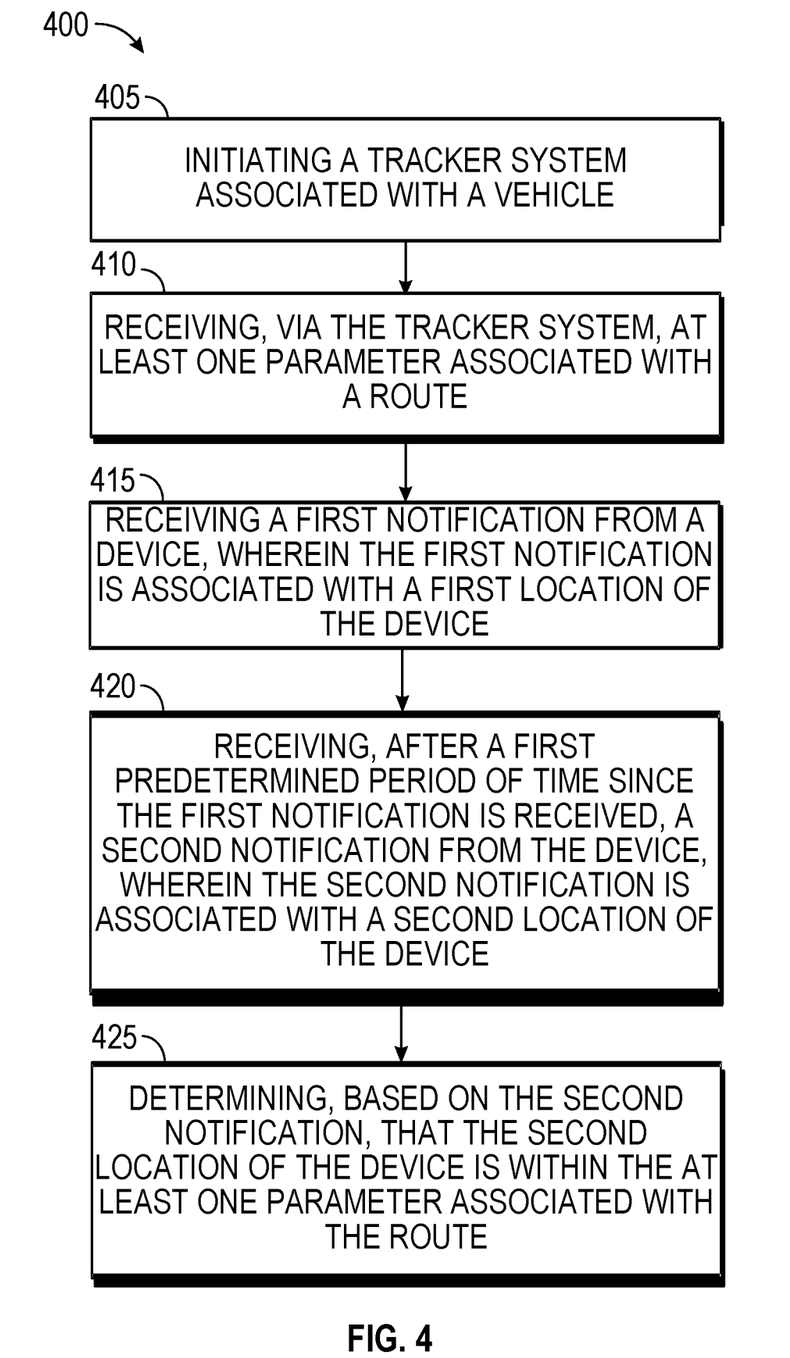
FIG. 4 depicts a flow chart of an example method for providing a vehicle- and drone-based tracking system in accordance with the disclosure.

FIG. 4 shows a flow chart 400 of an example method of providing a vehicle- and drone-based tracking system in accordance with the disclosure. The flow chart 400 illustrates a sequence of operations that can be implemented in hardware, software, or a combination thereof. In the context of software, the operations represent computer-executable instructions stored on one or more non-transitory computer-readable media such as a memory 326 provided in the vehicle computer 320, that, when executed by one or more processors such as the processor 322 provided in the vehicle computer 320, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flow chart 400 may be carried out by the vehicle computer 320 either independently or in cooperation with other devices such as, for example, other components of the vehicle 305, cloud elements (such as, for example, the computer 355, cloud storage 360, or a user device 365).

At block 405, a tracker system associated with a vehicle is initiated.

At block 410, at least one parameter associated with a route is received via the tracker system. In some embodiments, the at least one parameter may comprise a geographic area, a distance, or a duration.

At block 415, a first notification is received from a device. The first notification may be associated with a first location of the device. In some embodiments, an abnormal motion associated with the device may be detected. The tracker system may then initiate an emergency call based on the abnormal motion associated with the device.

At block 420, a second notification may be received from the device after a first predetermined period of time since the first notification has been received. The second notification may be associated with a second location of the device. In some embodiments, the first predetermined period of time may be calculated based at least in part on at least one of a battery level of the device or signal strength data associated with the device.

At block 425, a second location of the device may be determined to be within the at least one parameter associated with the route based on the second notification. In some embodiments, a third notification may be received from the device after a second predetermined period of time since the second notification has been received. The third location of the device may be determined to not be within the at least one parameter associated with the route based on the third notification.

In some embodiments, a verification request may be sent based on the determination that the third location of the device is not within the at least one parameter associated with the route. The tracker system may then wait for a third predetermined period of time for a response to the verification request. In some embodiments, an emergency call may be initiated if no response to the verification request is received after the third predetermined period of time. In some embodiments, a drone may be launched from the vehicle if no response to the verification request is received after the third predetermined period of time. The drone may be configured to fly to the second location associated with the device.

Figure 5:
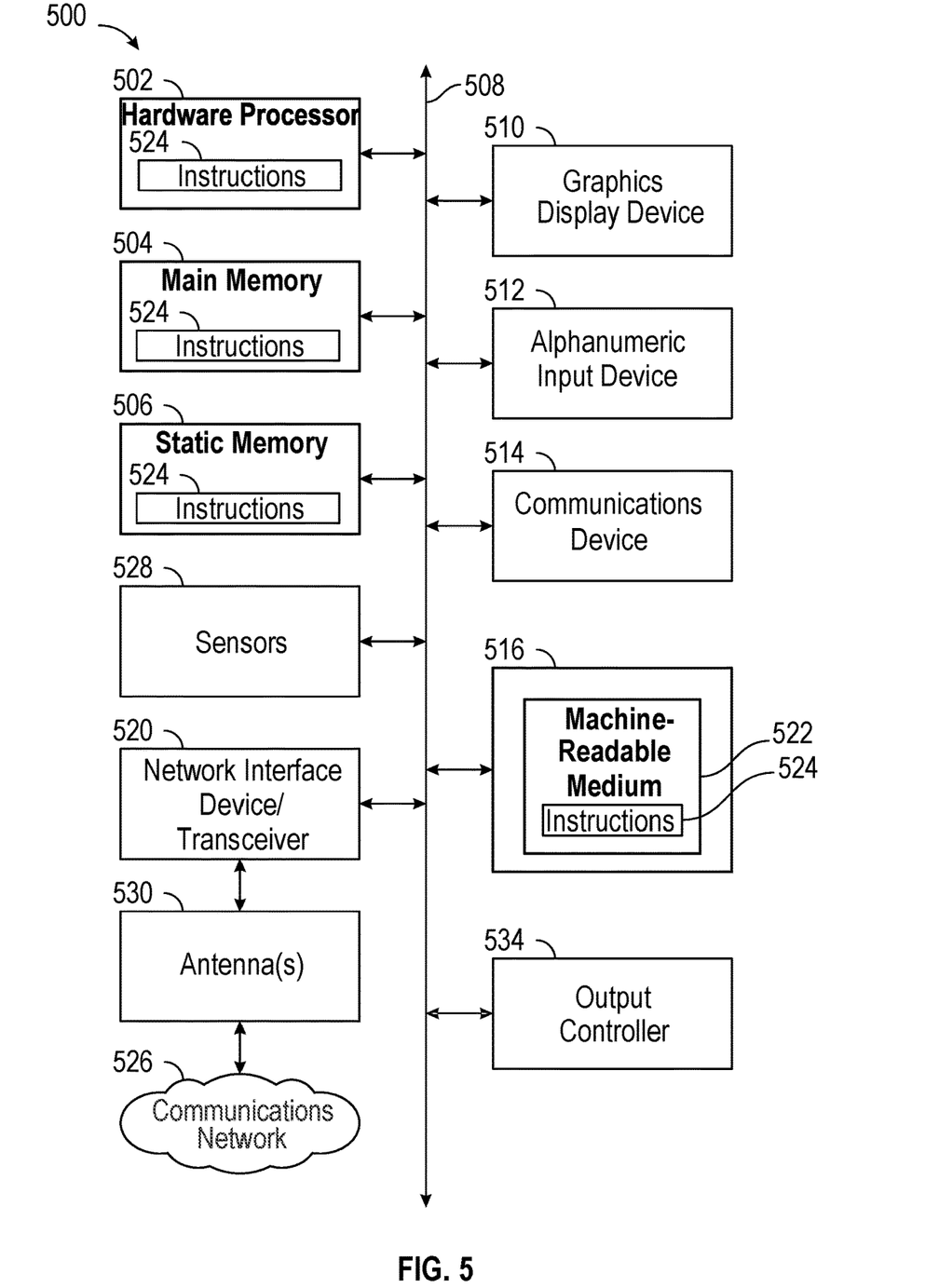
FIG. 5 depicts a block diagram of an example machine upon which any of one or more techniques (e.g., methods) may be performed, in accordance with an embodiment of the disclosure.

FIG. 5 depicts a block diagram of an example machine 500 upon which any of one or more techniques (e.g., methods) may be performed, in accordance with one or more example embodiments of the present disclosure. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. In some embodiments, the machine 500 may be the vehicle 305, as depicted in FIG. 3. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a graphics display device 510, an alphanumeric input device 512 (e.g., a keyboard), and a communications device 514. In an example, the graphics display device 510, the alphanumeric input device 512, and the communications device 514 may be a touch screen display. The machine 500 may additionally include a storage device (i.e., drive unit) 516, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee®, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 322, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 326, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey the information that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    initiating a tracker system associated with a vehicle;
    receiving, via the tracker system, at least one parameter associated with a route;
    receiving a first notification from a device, wherein the first notification is associated with a first location of the device;
    receiving, after a first predetermined period of time since the first notification is received, a second notification from the device, wherein the second notification is associated with a second location of the device;
    determining, based on the second notification, that the second location of the device is within the at least one parameter associated with the route;
    receiving, after a second predetermined period of time since the second notification is received, a third notification from the device, wherein the third notification is associated with a third location of the device; and
    determining, based on the third notification, that the third location of the device is not within the at least one parameter associated with the route.

2. The method of claim 1, wherein the at least one parameter comprises a geographic area, a distance, or a duration.

3. The method of claim 1, wherein the first predetermined period of time is calculated based at least in part on at least one of: a battery level of the device or signal strength data associated with the device.

4. The method of claim 1, further comprising:
    sending a verification request based on the determination that the third location of the device is not within the at least one parameter associated with the route;
    waiting a third predetermined period of time for a response to the verification request; and
    initiating an emergency call if no response to the verification request is received after the third predetermined period of time.

5. The method of claim 4, further comprising:
    launching a drone from the vehicle if no response to the verification request is received after the third predetermined period of time, wherein the drone is configured to fly to the second location associated with the device; and
    transmitting, via the drone, an emergency notification to a public-safety answering point.

6. The method of claim 1, further comprising:
    detecting an abnormal motion associated with the device; and
    initiating an emergency call based on the abnormal motion associated with the device.

7. A device, comprising:
    at least one memory device that stores computer-executable instructions; and
    at least one processor configured to access the at least one memory device, wherein the at least one processor is configured to execute the computer-executable instructions to:
    initiate a tracker system associated with a vehicle;
    receive, via the tracker system, at least one parameter associated with a route;
    receive a first notification from a user device, wherein the first notification is associated with a first location of the user device;
    receive, after a first predetermined period of time since the first notification is received, a second notification from the user device, wherein the second notification is associated with a second location of the user device;
    determine, based on the second notification, that the second location of the user device is within the at least one parameter associated with the route;
    detect an abnormal motion associated with the user device; and
    initiate an emergency call based on the abnormal motion associated with the user device.

8. The device of claim 7, wherein the at least one parameter comprises a geographic area, a distance, or a duration.

9. The device of claim 7, wherein the first predetermined period of time is calculated based at least in part on at least one of: a battery level of the user device or signal strength data associated with the user device.

10. The device of claim 7, wherein the at least one processor is further configured to execute the computer-executable instructions to:
    receive, after a second predetermined period of time since the second notification is received, a third notification from the user device, wherein the third notification is associated with a third location of the user device; and
    determine, based on the third notification, that the third location of the user device is not within the at least one parameter associated with the route.

11. The device of claim 10, wherein the at least one processor is further configured to execute the computer-executable instructions to:
    send a verification request based on the determination that the third location of the user device is not within the at least one parameter associated with the route;
    wait a third predetermined period of time for a response to the verification request; and
    initiate an emergency call if no response to the verification request is received after the third predetermined period of time.

12. The device of claim 11, wherein the at least one processor is further configured to execute the computer-executable instructions to:
    launch a drone from the vehicle if no response to the verification request is received after the third predetermined period of time, wherein the drone is configured to fly to the second location associated with the user device; and
    transmit, via the drone, an emergency notification to a public-safety answering point.

13. A non-transitory computer-readable medium storing computer-executable instructions which, when executed by a processor, cause the processor to perform operations comprising:
- initiating a tracker system associated with a vehicle;
- receiving, via the tracker system, at least one parameter associated with a route;
- receiving a first notification from a device, wherein the first notification is associated with a first location of the device;
- receiving, after a first predetermined period of time since the first notification is received, a second notification from the device, wherein the second notification is associated with a second location of the device;
- determining, based on the second notification, that the second location of the device is within the at least one parameter associated with the route;
- receiving, after a second predetermined period of time since the second notification is received, a third notification from the device, wherein the third notification is associated with a third location of the device; and
- determining, based on the third notification, that the third location of the device is not within the at least one parameter associated with the route.

14. The non-transitory computer-readable medium of claim 13, wherein the at least one parameter comprises a geographic area, a distance, or a duration.

15. The non-transitory computer-readable medium of claim 13, wherein the first predetermined period of time is calculated based at least in part on at least one of: a battery level of the device or signal strength data associated with the device.

16. The non-transitory computer-readable medium of claim 13, wherein the operations further comprise:
- sending a verification request based on the determination that the third location of the device is not within the at least one parameter associated with the route;
- waiting a third predetermined period of time for a response to the verification request; and
- initiating an emergency call if no response to the verification request is received after the third predetermined period of time.

17. The non-transitory computer-readable medium of claim 16, wherein the operations further comprise:
- launching a drone from the vehicle if no response to the verification request is received after the third predetermined period of time, wherein the drone is configured to fly to the second location associated with the device; and
- transmitting, via the drone, an emergency notification to a public-safety answering point.

* * * * *